(12) United States Patent
Berkovich et al.

(10) Patent No.: US 8,761,454 B2
(45) Date of Patent: Jun. 24, 2014

(54) DETECTING STREAKS IN PRINTED IMAGES

(75) Inventors: Alexander Berkovich, Haifa (IL); Pavel Kisilev, Maalot (IL)

(73) Assignee: Hewlett-Packard Development Company, L.P., Houston, TX (US)

( * ) Notice: Subject to any disclaimer, the term of this patent is extended or adjusted under 35 U.S.C. 154(b) by 278 days.

(21) Appl. No.: 13/104,490

(22) Filed: May 10, 2011

(65) Prior Publication Data

US 2012/0288200 A1    Nov. 15, 2012

(51) Int. Cl.
*G06K 9/00* (2006.01)
*G06K 9/34* (2006.01)

(52) U.S. Cl.
USPC ............................. 382/112; 382/175; 382/181

(58) Field of Classification Search
None
See application file for complete search history.

(56) References Cited

U.S. PATENT DOCUMENTS

| | | | | |
|---|---|---|---|---|
| 5,835,629 A * | 11/1998 | Seo | ............................. | 382/173 |
| 5,850,294 A * | 12/1998 | Apostolopoulos et al. | ......................... | 358/426.14 |
| 6,646,725 B1 * | 11/2003 | Eichinger et al. | ............... | 356/28 |
| 7,376,269 B2 * | 5/2008 | Klassen et al. | ................ | 382/167 |
| 7,684,625 B2 * | 3/2010 | Hyoki | ............................. | 382/217 |
| 7,783,103 B2 * | 8/2010 | Kuchii et al. | ................. | 382/149 |
| 7,783,122 B2 * | 8/2010 | Wu et al. | ......................... | 382/254 |
| 7,834,873 B2 * | 11/2010 | Kurupati | ......................... | 345/423 |
| 8,368,955 B2 * | 2/2013 | Wu | ................................... | 358/1.9 |
| 8,391,585 B2 * | 3/2013 | Kuchii | ........................... | 382/141 |
| 2002/0149808 A1 * | 10/2002 | Pilu | ................................ | 358/530 |
| 2009/0046113 A1 * | 2/2009 | Murakami et al. | ............ | 345/690 |
| 2010/0303305 A1 * | 12/2010 | Nachlieli et al. | .............. | 382/112 |

OTHER PUBLICATIONS

Weisstein, Eric W.; "Kurtosis"; MathWorld—A Wolfram Web Resource; Wolfram Research, Inc.; http://mathworld.wolfram.com/Kurtosis.html.

Simoncelli, Eero P., et al.; "Noise Removal via Bayesian Wavelet Coring"; Proceedings of 3rd IEEE International Conference on Image Processing; Sep. 1996; pp. 379-382; vol. I; IEEE Signal Processing Society; Lausanne, Switzerland.

* cited by examiner

*Primary Examiner* — Thomas Conway

(57) ABSTRACT

A method of detecting streaks in printed documents comprises, with an imaging device, capturing an image of a printed document, transmitting the image data representing the printed document to a computing device, with the computing device, dividing the image data into a number of rectangles horizontally across the image data so that the rectangles overlap in the horizontal direction, and with the computing device, determining if a rectangle comprises a streak. A system for detecting and evaluating streaks in printed document comprises a printing device that prints a document based on image data received from a computing device, an imaging device that captures an image of the printed document, and a streak detector that detects streaks within the captured image of the printed document.

13 Claims, 9 Drawing Sheets

DETECTING STREAKS IN PRINTED IMAGES

BACKGROUND

With the advancement of printing processes and systems, quality control of a finished printed document is performed. A printed document sometimes includes various types of printing defects called streaks. Streaks may be the result of various mechanical disturbances within the printing device. For example, malfunctioning printing gear, contaminants such as, for example, a paper strip or other dirt adhered to a printer drum, or mechanical or physical obstructions such as debris in the printing device preventing proper function of the printer or displacement of parts of the printer that cause the printer to work improperly. The resulting streaks may occur globally on the entire printed page, and comprise a continuous or semi-continuous disturbance through the length of the printed document.

These streaks, whose widths may range from a few pixels up to a few mm, devalue the quality of the printed document. In such a case, a print shop or other dealer in printed materials may potentially loose revenue due to the poor quality of the printed document.

BRIEF DESCRIPTION OF THE DRAWINGS

The accompanying drawings illustrate various examples of the principles described herein and are a part of the specification. The illustrated examples are given merely for illustration, and do not limit the scope of the claims.

Throughout the drawings, identical reference numbers designate similar, but not necessarily identical, elements.

DETAILED DESCRIPTION

The present system and method detects and evaluates the severity of a number of types of streaks that may result during the printing of a document. A computing device instructs a printing device to print a document. An imaging device captures an image of the printed document, and sends image data representing the captured image of the printed document to the computing device, and, more specifically, a streak detector. The streak detector then detects and evaluates the severity of streaks within the printed document by analyzing the image data representing the captured image of the printed document.

Print defect detection methods target defects of various types, shapes, and sizes. They are usually designed without considering defect-specific characteristics, and their detection ability relies solely on the contrast of a defect with respect to its neighboring area. Such detection methods may fail to detect streaks. Streaks are difficult to detect because of their very low contrast with respect to the background, which may itself be textured or noisy, and their small width.

As used in the present specification and in the appended claims, the term "image data" or similar language is meant to be understood broadly as any image representation, such as, for example, a graphical image (e.g. a photograph), a vector-graphics image (e.g. graphics), or textual graphics, among others. Further, as used in the present specification and in the appended claims, the term "printed document," "printed image," or similar language is meant to be understood broadly as any reproduction, reconstruction, or copy of the image data, whether produced by a printer or by other reproduction, reconstruction, or copying device.

Still further, as used in the present specification and in the appended claims, the term "a number of" or similar language is meant to be understood broadly as any positive number comprising 1 to infinity; zero not being a number, but the absence of a number.

In the following description, for purposes of explanation, numerous specific details are set forth in order to provide a thorough understanding of the present systems and methods. It will be apparent, however, to one skilled in the art that the present apparatus, systems, and methods may be practiced without these specific details. Reference in the specification to "an example" or similar language means that a particular feature, structure, or characteristic described in connection with that example is included as described, but may not be included in other examples.

Figure 1:
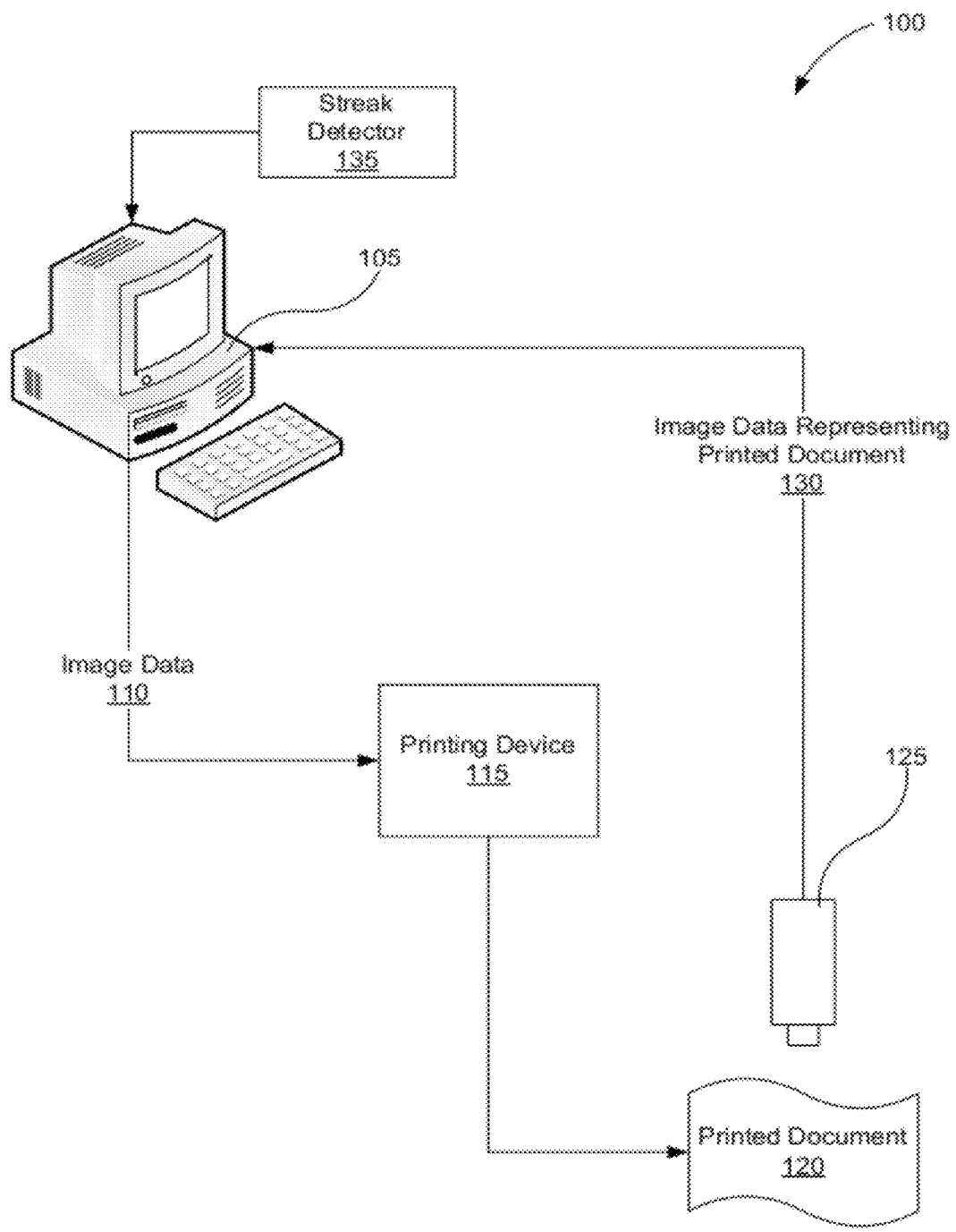
FIG. 1 is a block diagram of a system for detecting streaks in printed documents, according to one example of the principles described herein.

FIG. 1 is a block diagram of a system (100) for detecting streaks in printed documents (120), according to one example of the principles described herein. The system (100) comprises a computing device (105) communicatively coupled to a printing device (115). The printing device prints a printed document (120) based on image data (110) sent to the printing device (115) from the computing device (105). The system (100) further comprises an imaging device (125) communicatively coupled to the computing device (105) that captures images of the printed document (120), and transmits the captured images to the computing device (105) for detection of streaks by a streak detector (135) communicatively coupled to the computing device (105), as will be described in more detail below.

The various elements of the system (100) will now be described in more detail. The computing device (105) is any device comprising a processor and associated memory that performs the methods disclosed herein including transmission of the image data (110) to the printing device (115) and detection of streaks in a printed document (120). Examples of a computing device comprise a desktop computer, a laptop computer, a personal digital assistant (PDA), a smart phone, and a server, among others. The streak detector (135) communicatively coupled to the computing device (105) comprises hardware or a combination of hardware and software that analyzes images of a printed document (120) captured by the imaging device (125).

The printing device (115) within the system (100) is any device capable of producing a printed document (120) based on image data (110) transmitted from the computing device (105). Examples of the printing device (115) comprise a laser printer, an LED printer, inkjet printer, and a digital printing press, among others. Further, the printing device (115) is, for example, an offset printing press. In another example, the printing device is an Indigo® 7500 series offset digital press manufactured by Hewlett-Packard®.

The imaging device (125) is any device that captures images of the printed document (120) and transfers the image data (130) representing the printed document (120) to the computing device (105) and streak detector (135) for analysis. Examples of imaging devices (125) comprise a digital camera, a scanner, a video camera, and a charge-coupled device (CCD), among others.

The image data (110) is any image capable of printing. The image data (110), in one example, is encoded as a bit map, a TIFF image, a JPEG image, a GIF image, or any other image capable of being printed by the printing device (115). Further, in another example, the image data (110) is encoded in any of the various print control languages that instruct printers in the production of documents.

In the present example, for the purposes of simplicity in illustration, the computing device (105), printing device (115), imaging device (125), and streak detector (135) are separate computing devices communicatively coupled to each other through a network. However, the principles set forth in the present specification extend equally to any alternative configuration. As such, alternative examples within the scope of the principles of the present specification include, but are not limited to, examples in which the computing device (105), printing device (115), imaging device (125), and streak detector (135) are implemented by the same computing device, examples in which the functionality of the computing device (105) and streak detector (135) is implemented by a multiple interconnected computers (e.g., a server in a data center and a user's client machine), and examples in which the computing device (105), printing device (115), imaging device (125), and streak detector (135) communicate directly through a bus without intermediary network devices. Another alternative example comprises an example in which the printing device (115) and imaging device (125) are implemented by the same device.

Figure 2:
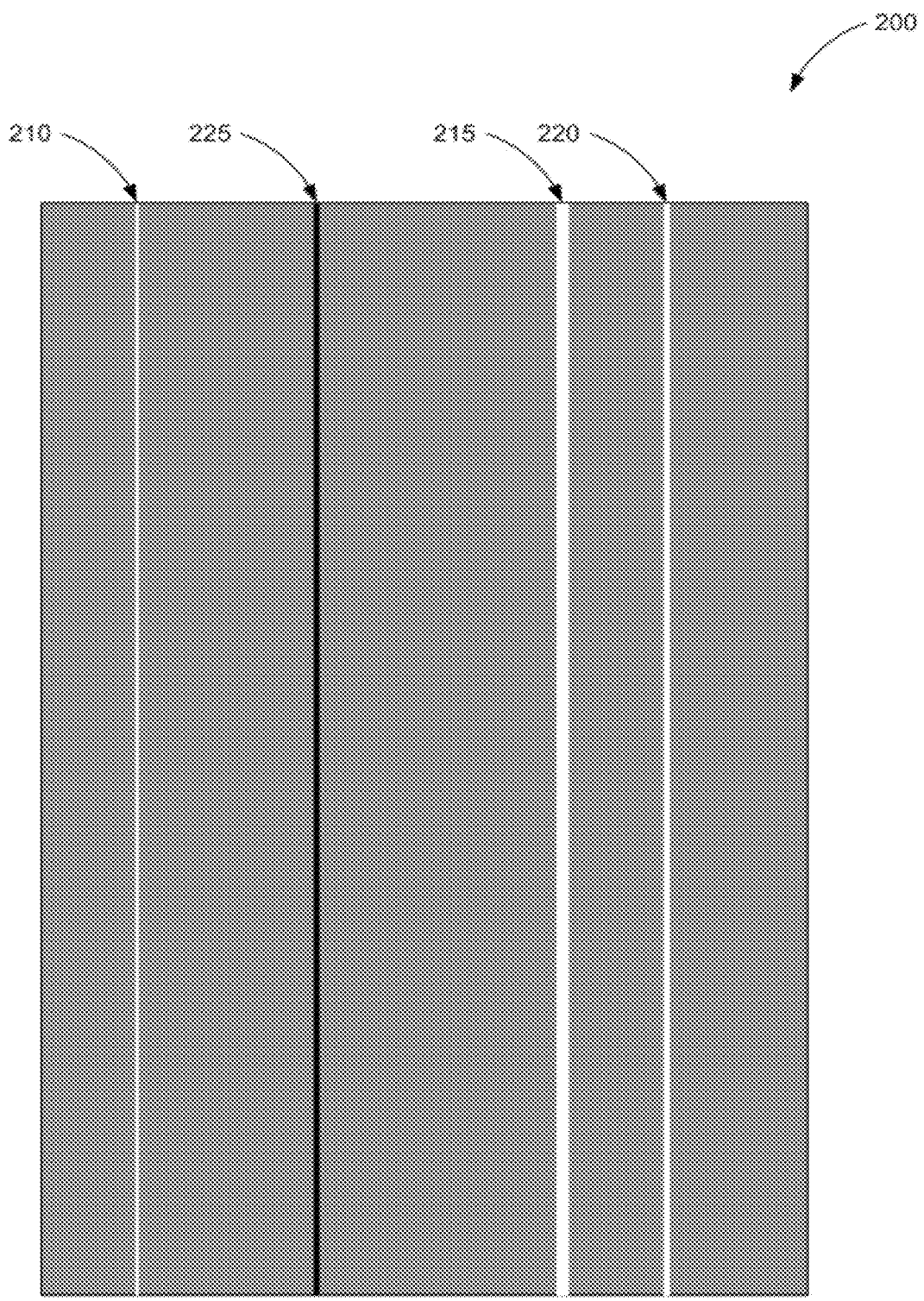
FIG. 2 is a diagram of streaks within a printed document, according to one example of the principles described herein.
Figure 3:
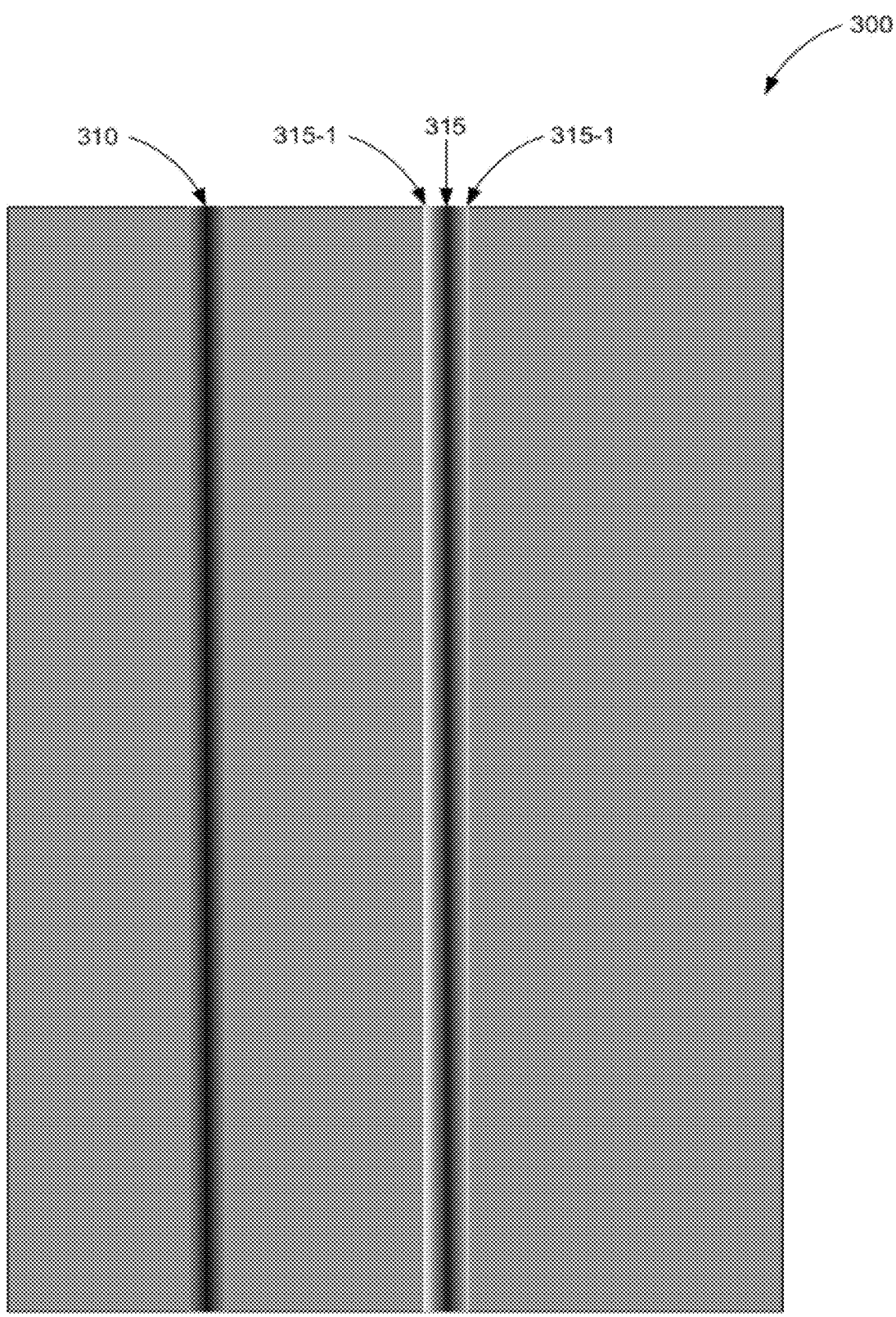
FIG. 3 is a diagram of streaks within a printed document, according to another example of the principles described herein.

FIGS. 2 and 3 are diagrams of streaks (210, 215, 220, 225, 310, 315) within a printed document (200, 300), according to another example of the principles described herein. A first type of streak (210, 215, 220, 225) appears to be a vertical line, either white (210, 215, 220) or black (225). FIG. 2 depicts the first type of streak (210, 215, 220, 225) comprising various widths. In one example the streaks (210, 215, 220, 225) comprise widths in ranges from a single pixel to a few tenths of pixels wide. In another example, the streaks (210, 215, 220, 225) comprise unbounded widths. In yet another example, the streaks (210, 215, 220, 225) comprise widths less than approximately a few tenths of pixels. In yet another example, the streaks (210, 215, 220, 225) comprise widths less than approximately 20 pixels. The severity of the first type of streaks (210, 215, 220, 225) can change throughout the length of the printed document (120) from portions of the streaks (210, 215, 220, 225) being completely invisible to portions of the streaks (210, 215, 220, 225) comprising severe obstructions within the printed document (120) causing the printed document (120) to be of an unacceptably low quality.

The second type of streaks (310, 315), referred to as wiper streaks, are much wider than the first type of streaks (210, 215, 220, 225) and may comprise a width of a few millimeters wide or more. Like the first type of streaks (210, 215, 220, 225), the wiper streaks (310, 315) create a generally vertical line through the length of the printed document (120). FIG. 3 depicts wiper streaks (310, 315) of various widths. However, the wiper streaks (310, 315) differ from the first type of streaks (210, 215, 220, 225) in that they comprise a non-uniform inner structure. The wiper streaks (310, 315) are dark in the middle, and brighter towards the edges (315-1) thereof, and may be bounded by one or two white pixels on the edges (315-1).

Figure 4:
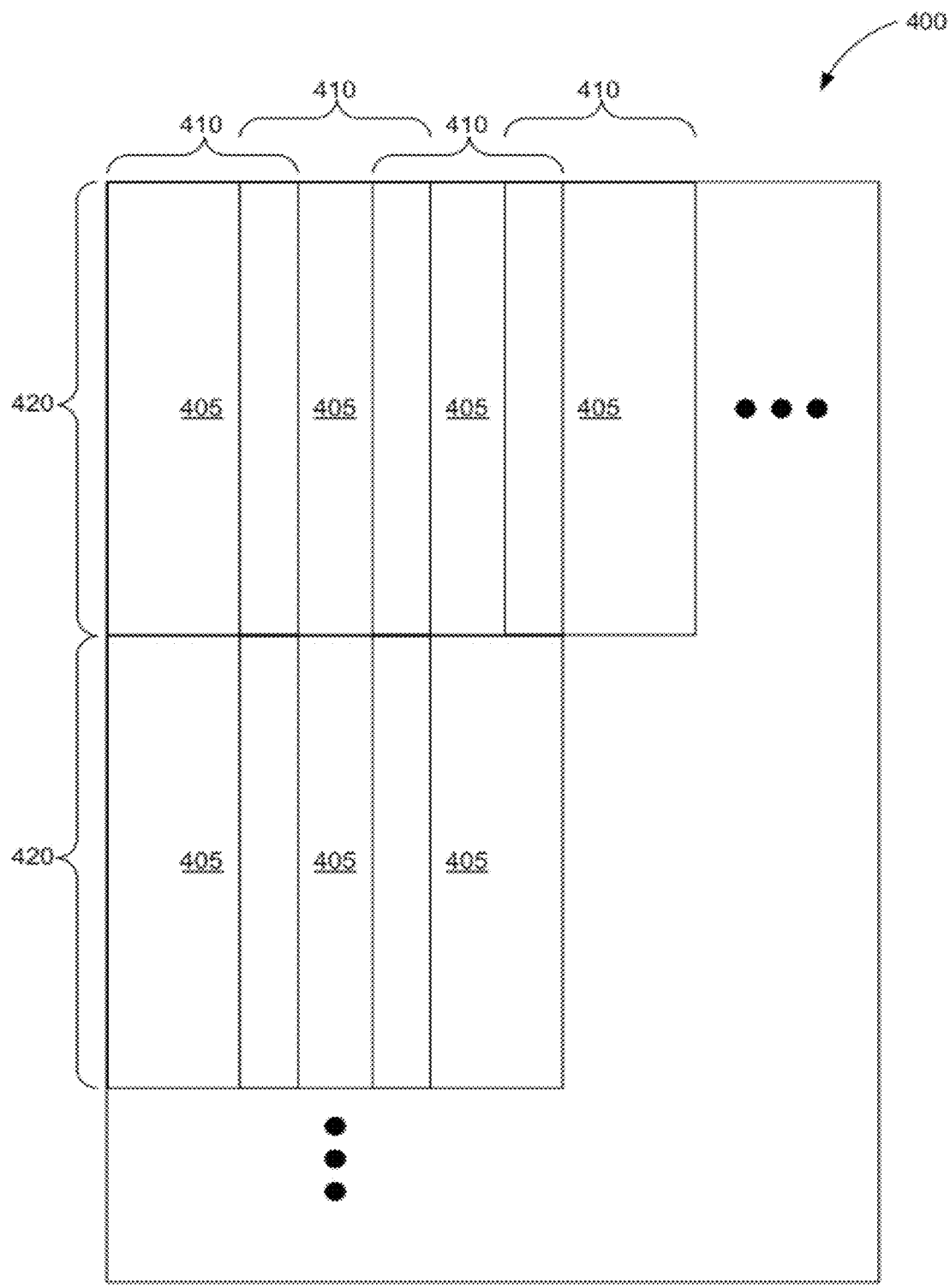
FIG. 4 is a diagram of rectangles dividing portions of a captured image of a printed document, according to one example of the principles described herein.
Figure 5:
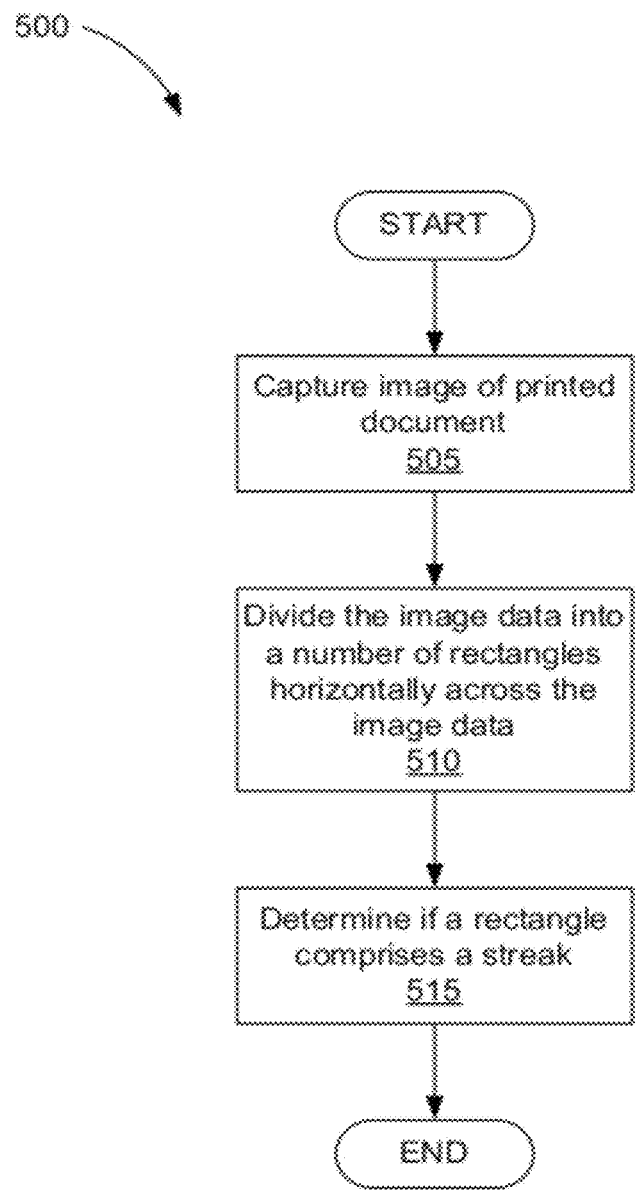
FIG. 5 is a flowchart showing a streak detection method utilizing a streak detector, according to one example of the principles described herein.

Because of the general difference in streak width between the first type of streaks (210, 215, 220, 225) and the wiper streaks (310, 315), different methods of detecting their inclusion within a printed document (120) and evaluating their severity comprises different but similar processes as will now be described in more detail below. To begin, FIG. 5 is a flowchart showing a streak (210, 215, 220, 225) detection method utilizing a streak detector (135), according to one example of the principles described herein. In this example of detecting the first type of streaks (210, 215, 220, 225), the method begins by capturing (block 505) an image of a printed document (120) with the imaging device (125). In one example, image data (130) representing the printed document (120) is sent to the computing device, and, more specifically, to the streak detector (135). The streak detector (135) then analyzes the image data (130) by dividing (block 510) the image data (130) into a number of rectangles (405) horizontally across the image data, as depicted in FIG. 4, and the streak detector (135) determines (block 515) if a rectangle (405) comprises a streak (210, 215, 220, 225). FIG. 4 is a diagram of rectangles dividing portions of a captured image (400) of a printed document (120), according to one example of the principles described herein.

Recalling FIG. 2 in relation to FIGS. 4 and 5, the streaks (210, 215, 220, 225) vary in width, are approximately vertical throughout the length of the captured image (400), and, in some examples, are not visible throughout the entire length of the captured image (400). In fact, in other examples, faint streaks (210, 215, 220, 225) appear on some parts of the captured image (400) and are not visible on other parts of the captured image (400). For that reason the captured image (400) is divided into small overlapping rectangles (405). The rectangles' (405) longer dimensions (420) are in the direction of the printing process. In the present example, the streaks (210, 215, 220, 225) are vertical with respect to the captured image of FIG. 4. The reason for using overlapping rectangles (405) is to increase the chance of catching a streak (210, 215, 220, 225) locally in at least one of the rectangles (405).

The brackets on top (410) and to the side (420) of the rectangles (405) emphasize that the rectangles (405) overlap only on the horizontal direction. In one example, the rectangles (405) are 70 pixels in length (420) by 20 pixels in width (410) with 10 pixels overlapping between two adjacent rectangles (405). The reasoning for these dimensions is that a small streak (210, 215, 220, 225) may be a few pixels wide. In this manner, a single rectangle (405) will not contain more than a single streak (210, 215, 220, 225); a rectangle (405) will contain both the streak (210, 215, 220, 225) and background. The height of the rectangles (405) is small enough for the streak (210, 215, 220, 225) to be inside a single rectangle (405), or, in one example, may be shifted by a single pixel. However, a small rectangle (405), in another example, may contain noise that may be mistaken for a streak (210, 215, 220, 225). In one example, half the rectangle's (400) width is utilized as the overlapping size. In this example, this ensures that a streak (210, 215, 220, 225) is included within a rectangle (405).

Figure 6:
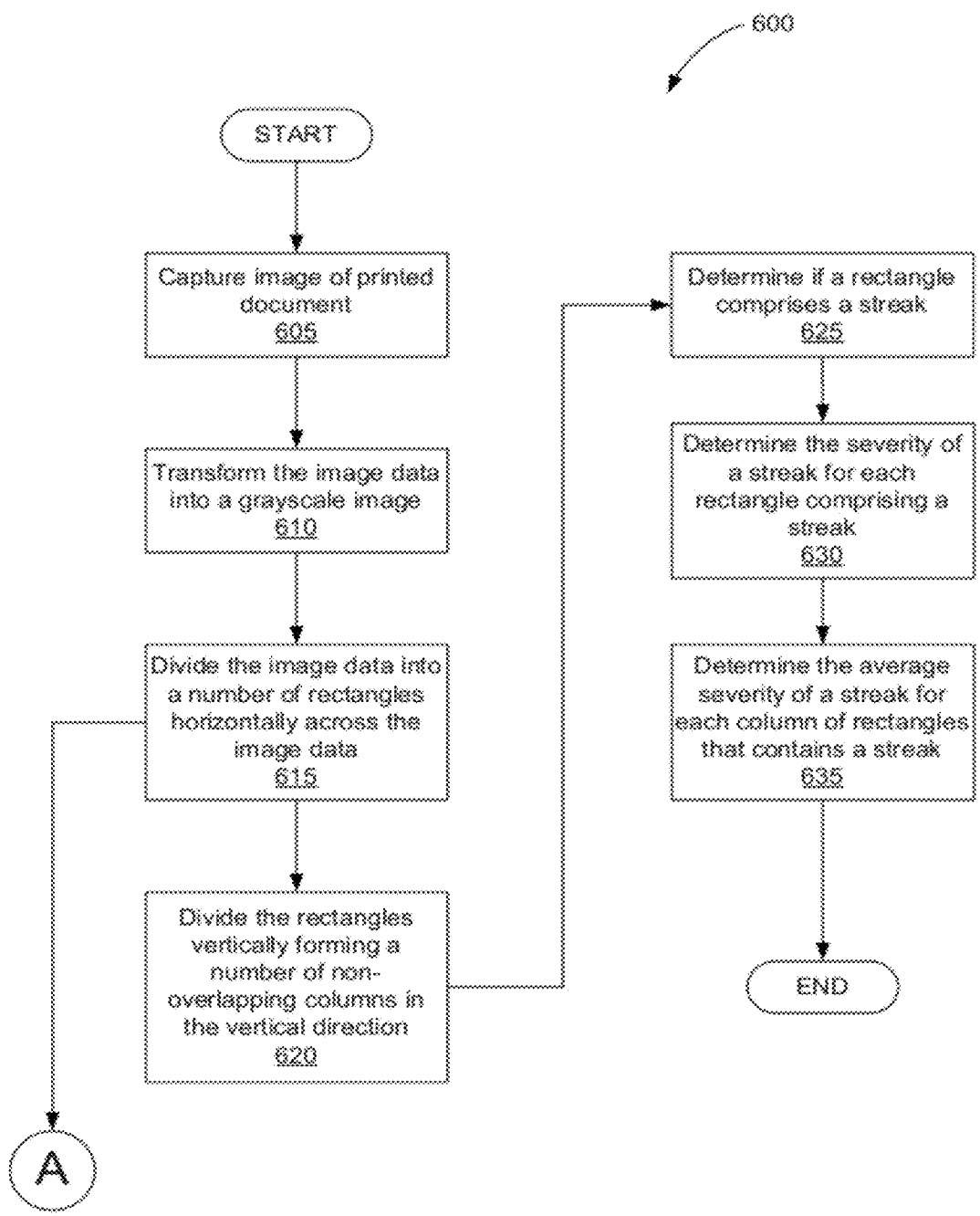
FIG. 6 is a flowchart showing a streak detection method utilizing a streak detector, according to another example of the principles described herein.

FIG. 6 is a flowchart showing a streak (210, 215, 220, 225) detection method utilizing a streak detector, according to another example of the principles described herein. More specifically, FIG. 6 is a flowchart showing a more detailed method of streak (210, 215, 220, 225) detection. Detecting a streak (210, 215, 220, 225) within a rectangle (405) is performed by satisfying a number of conditions in order to be considered as a rectangle (405) with a streak. First, as described above, an image of a printed document (120) is captured (block 605) with the imaging device (125).

The image data (130) representing the printed document (120) is transformed (block 610) into a grayscale image for processing. In order to detect both white and black streaks within the printed document (120) the method (600) is applied twice; once for the rectangles (405) as captured from the printed document (120), and once when the values of the rectangles (405) are inversed. In one example, the inversed image is obtained by taking the number 255 and subtracting the grayscale value for each pixel from 255. Next, the profile of the block is found, by averaging the block gray levels along its columns.

The streak detector (135) then analyzes the image data (130) by dividing (block 615) the image data (130) into a number of rectangles (405) horizontally across the image data, as depicted in FIG. 4. The streak detector (135) further divides (block 620) the rectangles (405) vertically forming a number of non-overlapping columns of rectangles (405) in the vertical direction.

The method (600) proceeds with determining (block 625) if a rectangle (405) comprises a streak (210, 215, 220, 225). In determining (block 625) if a rectangle (405) comprises a streak (210, 215, 220, 225), the maximal point of a rectangle (405), in some examples, is close to the edge of the rectangle (405). In an example where the maximal value is on the edge, this is caused by the rectangle (405) boundaries cropping the peak or maximal value of a streak (210, 215, 220, 225), and in any case, if a maximal is very close to the edge of a rectangle (405), the streak's (210, 215, 220, 225) severity may not be correctly determined. Thus, in one example, a threshold is set regarding how close the maximum can be to an edge of a rectangle (405). In one example, this threshold is set at half the distance of the overlapping portions of the rectangles (405).

In an example wherein a rectangle (405) comprises a streak (210, 215, 220, 225), the rectangle's (405) profile has a distinguishable peak or maximum. Thus, in one example, in determining (block 625), the Kurtosis may be determined. The Kurtosis is a measure of the "peakedness" of the probability distribution of a streak (210, 215, 220, 225) within a rectangle (405). The Kurtosis is defined in equation 1:

$$K(x) = \frac{\mu^4}{\sigma^4} = \frac{E((x - Ex)^4)}{(E(x^2) - (Ex)^2)^2} \quad \text{Eq. 1}$$

where x equals a rectangle's (405) profile vales.

The result of the above Kurtosis measure on various profiles of the rectangles (405) is a high value in examples where there is a peak (i.e., where there is a streak (210, 215, 220, 225)), and low in examples where there is not a peak (i.e., where there is not a streak (210, 215, 220, 225)). However, the Kurtosis does not take into consideration the width of the peak or any other characteristics of the profile of the rectangles (405). For that reason, in one example, a standard deviation (Std) of the profile is determined, and set at a threshold; the threshold being variable and indicative of a peak. In one example, for peaks of the Kurtosis value is approximately 2.5, and the standard deviation is approximately around 0.9.

Along with the determination of the Kurtosis and standard deviation values, an additional measurement for detecting a peak in a profile may be applied in one example. In a profile with a single peak or maximum, the median is relatively similar to the minimal value of the profile, and relatively different from the maximal value. With this observation, an additional method of measuring a peak in a profile may be conducted as follows. The profile is normalized to be between 0 and 1. Next, the $10^{th}$ and $90^{th}$ percentiles of the values in the profile are determined. In this example, a value that is bigger than 10% of the value in the profile and a value that is bigger than 90% of the values in the profile are determined, respectively. Next, a median of the values in the profile between the $10^{th}$ percentile and the $90^{th}$ percentile is determined. The measure R(x) for the peak of a profile, is defined in equation 2:

$$R(x) = \frac{\max(x) - \text{median}(x^{10\%} : x^{90\%})}{\text{median}(x^{10\%} : x^{90\%}) - x^{10\%}} \quad \text{Eq. 2}$$

R(x) is high in the case where there is a peak in the profile. However, unlike K(x), R(x) is not high in the case where there exists both a peak and a decline of the profile. In one example, R(x) is approximately 5.5 in case of a profile with a peak.

Turning again to FIG. 6, the method (600) proceeds with determining (block 630) the severity of a streak (210, 215, 220, 225) for each rectangle (405) comprising a streak. If a rectangle's (405) profile satisfies a number of the conditions disclosed above; namely Std, K(x), R(x) are high, and the location of the maximal value is not near the edges, the rectangle (405) is marked as a rectangle (405) comprising a streak (210, 215, 220, 225). The severity of the streak (210, 215, 220, 225), S(x), is determined by the difference between the maximal value in the profile and the median applied on the 50% of the smallest values in the profile, as demonstrated in equation 3:

$$S(x) = \max(x) - \text{median}(x(\min):x^{50\%}) \quad \text{Eq. 3}$$

Next, the average severity of a streak for each column of rectangles that contains a streak is determined (block 635). In blocks 605 through 630 of FIG. 6, the rectangles (405) were processed independently. However, for each column of rectangles (405), the average of the severity of the streaks (210, 215, 220, 225) is determined. If the average is higher than a certain threshold, the current column contains a streak (210, 215, 220, 225), and the average is its severity. In one example, the threshold of the average of the severity of the streaks (210, 215, 220, 225) is 1.

Because a streak (210, 215, 220, 225) is, in some examples, not aligned on a single pixel throughout the entire printed document (120), the location of the streak may not be determined up to a single pixel. Possible choices for the approximated location of a streak (210, 215, 220, 225) are the pixel on the top rectangle (405) of the column, or the averaged location over all the rectangles (405) the streak was found in.

Figure 7:
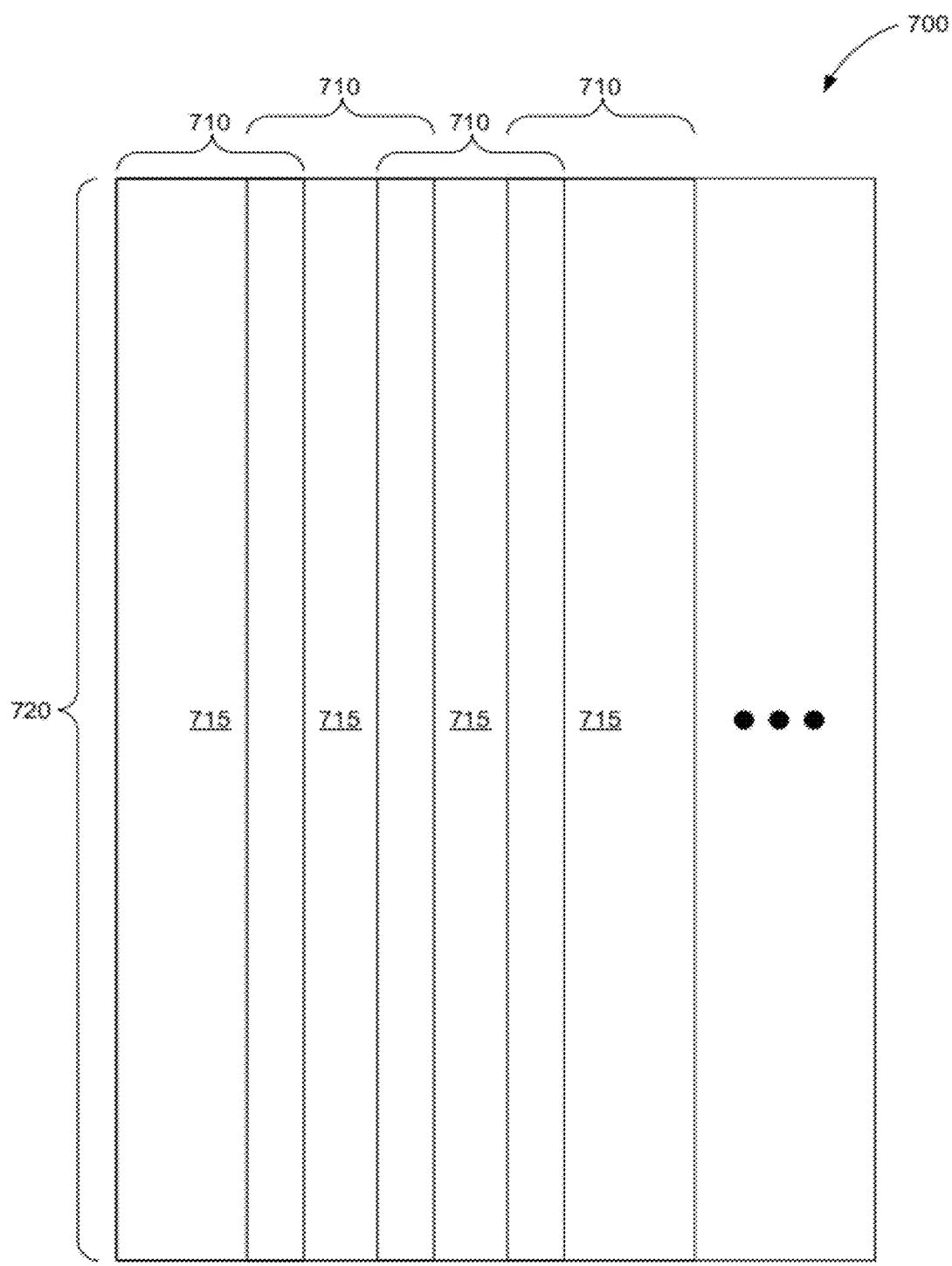
FIG. 7 is a diagram of rectangles dividing portions of a captured image of a printed document, according to another example of the principles described herein.
Figure 8:
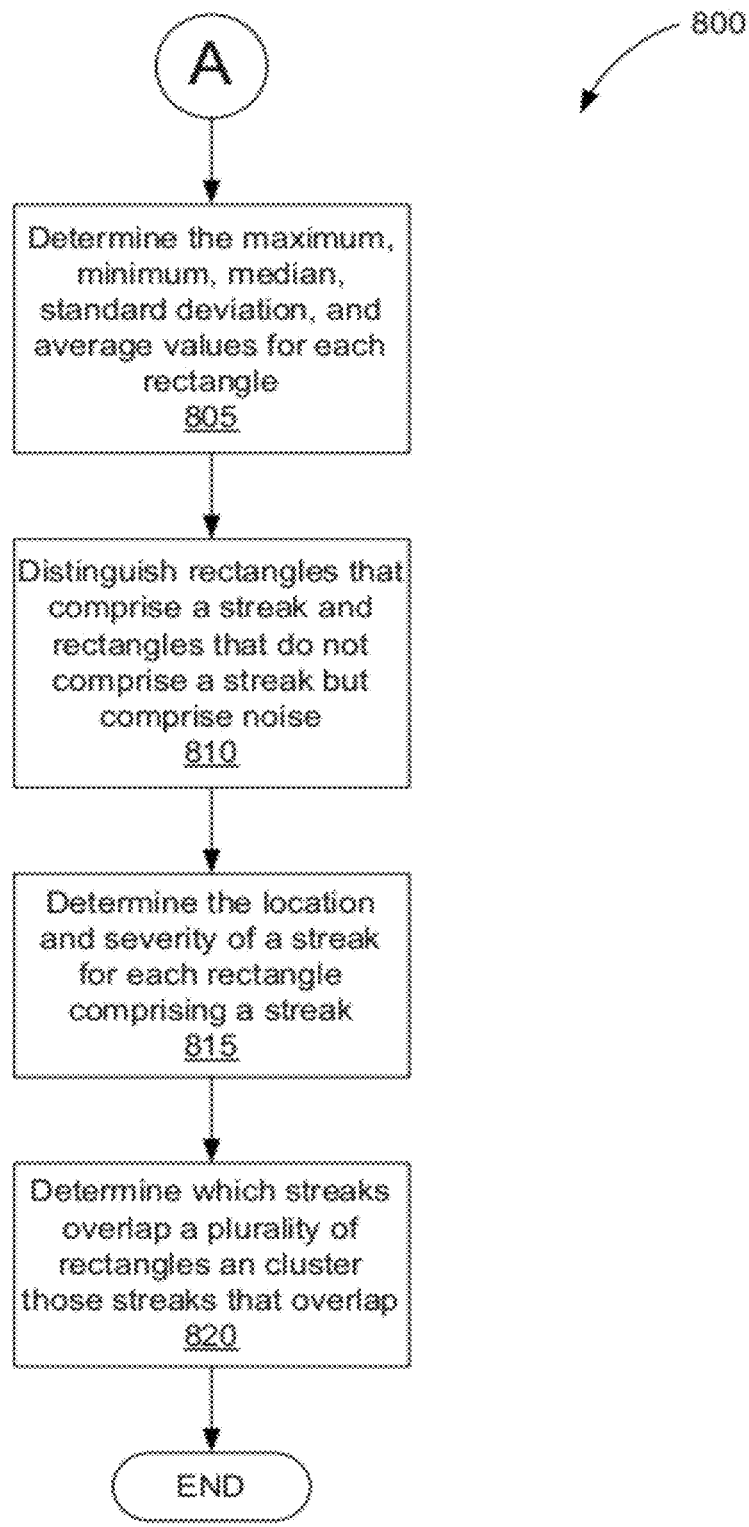
FIG. 8 is a flowchart showing a streak detection method utilizing a streak detector, according to yet another example of the principles described herein.

FIG. 8 is a flowchart showing a streak (210, 215, 220, 225) detection method utilizing a streak detector (135), according to yet another example of the principles described herein. Further, FIG. 7 is a diagram of rectangles (715) dividing portions of a captured image of a printed document, according to another example of the principles described herein. As disclosed above, the streaks (210, 215, 220, 225) may be of various widths. The method (600) of FIG. 6 handles relatively narrower streaks (210, 215, 220, 225). In one example, the method (600) of FIG. 6 handles streaks (210, 215, 220, 225)

of up to approximately around 3 pixels wide. Wider streaks (310, 315) will cause wide peaks in the profile, which may yield low R(x) values as well as low Std and K(x) values.

Therefore, the method (800) of FIG. 8, applying the same basic process as disclosed in blocks 605 through 635 of FIG. 6 on samples of the image data (130) representing the printed document (120) will enable detection and evaluation of wider streaks (310, 315). In each rectangle (715), the captured image (700) is sampled in the horizontal direction. The number of rectangles (715) is determined by the range of widths of the streaks (310, 315), with each rectangle (715) handling streaks (310, 315) approximately twice as thick as the previous one. In one example, 5 rectangles (715) are used in the captured image (700). If wider streaks are expected, more rectangles (715) are used.

The method (800) disclosed in FIG. 8, may be divided into two phases; the first phase being local detection of wiper streaks (310, 315), and the second phase being uniting the local information with a global wiper streaks (310, 315) detection. As disclosed above, the one aspect of both types of streaks (210, 215, 220, 225, 310, 315) that is similar is that they are approximately vertical with respect to the captured image (400, 700). However, the wiper streaks (310, 315) are relatively wider, and their visibility does not vary greatly throughout the captured image (700). Therefore, the captured image (700) can be divided to a small number of rectangles (715), and the wiper streaks (310, 315) will be vertical in each rectangle (715). In one example, the captured image (700) is divided into 6 different rectangles (715).

First, the streak detector (135) determines (block 805) the maximum, minimum, median, standard deviation, and average values for each rectangle (715). Detecting the wiper streaks (310, 315) within a single rectangle (715) comprises, first, determining the profile of the rectangle (715) by averaging the gray levels of each column in the rectangle (715). The full profile of the captured image (700) is divided into a number of overlapping rectangles (700). In one example, the length (720) of each rectangle (715) is 100 pixels, and the overlap size of each rectangle (715) is ⅓ of its length, meaning 33 pixels. Thus, the method of FIG. 8 is similar to the Method of FIG. 6 except that the size of the rectangles (715) is relatively larger in FIGS. 7 and 8.

Each rectangle (715), divided within the captured image (700), is processed, and a number of characteristics are determined (block 805). The characteristics determined for each rectangle (715) is its maximum, minimum, median, Std, and average. These characteristics are arranged in vectors as follows:

$$\text{MaxVec}=[\max(\text{section}_1),\max(\text{section}_2),\max(\text{section}_3)\ldots] \quad \text{Eq. 4}$$

$$\text{MinVec}=[\min(\text{section}_1),\min(\text{section}_2),\min(\text{section}_3)\ldots] \quad \text{Eq. 5}$$

$$\text{MedVec}=[\text{median}(\text{section}_1),\text{median}(\text{section}_2),\text{median}(\text{section}_3)\ldots] \quad \text{Eq. 6}$$

$$\text{StdVec}=[\text{Std}(\text{section}_1),\text{Std}(\text{section}_2),\text{Std}(\text{section}_3)\ldots] \quad \text{Eq. 7}$$

$$\text{MeanVec}=[\text{mean}(\text{section}_1),\text{mean}(\text{section}_2),\text{mean}(\text{section}_3)\ldots] \quad \text{Eq. 8}$$

Using these characteristics determined in Equations 4-8 for each rectangle (715), additional quantities are determined for each rectangle (715). The purpose of the following quantities is to distinguish (block 810) rectangles (715) that contain wiper streaks (310, 315) from those rectangles (715) that do not contain a wiper streak (715), but may contain noise. Denoting the values of rectangle (715) i's profile as $x_i$, these quantities are found as follows.

The first descriptor is Boolean, denoted by neigh_big($x_i$), and is equal to 1 when the mean of a rectangle (715) is either bigger than the mean of both its neighboring rectangles (715), or smaller than they are. Thus:

$$\text{neigh\_big}(x_i) = \begin{cases} 1, & \text{if } (\text{mean}(x_{i-1}) - \text{mean}(x_i)) \cdot \\ & (\text{mean}(x_{i+1}) - \text{mean}(x_i)) = 1 \\ 0, & \text{else} \end{cases} \quad \text{Eq. 9}$$

This result is arranged in a single vector to get:

$$\text{NeighVec}=[\text{neigh\_big}(\text{section}_1),\text{neigh\_big}(\text{section}_2),\text{neigh\_big}(\text{section}_3)\ldots] \quad \text{Eq. 10}$$

For the second descriptor, the extreme point of the rectangle's (715) profile is determined. The difference between the maximal value and the median value is compared to the difference of the median value and the minimum value. The extreme point whose difference is bigger (in absolute value) is then chosen as the extreme point for the rectangle (715). The location of the extremum is denoted by ch_ext(xi):

$$\text{ch\_ext}(x_i) = \begin{cases} \text{index of } \max(x_i), & \text{if } \max(x_i) - \text{median}(x_i) > \\ & \text{median}(x_i) - \min(x_i) \\ \text{index of } \min(x_i), & \text{else} \end{cases} \quad \text{Eq. 11}$$

This result is arranged in a single vector to get:

$$\text{ExtrLocVec}=[\text{ch\_ext}(\text{section}_1),\text{ch\_ext}(\text{section}_2),\text{ch\_ext}(\text{section}_3)\ldots] \quad \text{Eq. 12}$$

The maximal of two values is chosen: the maximal difference between the neighbors' median and the current's section minimum; the maximal difference between the maximum of the current section and the maximum of the current' section neighbors.

$$\text{diff\_val}(x_i)=\max(v_1(x_i),v_2(x_i)) \quad \text{Eq. 13}$$

where $v_1$ and $v_2$ are defined as:

$$v_1(x_i)=\max(\text{median}(x_{i-1})-\min(x_i),\text{median}(x_{i+1})-\min(x_i)) \quad \text{Eq. 14}$$

$$v_2(x_i)=\max(\max(x_1)-\max(x_{i-1}),\max(x_i)-\max(x_{i+1})) \quad \text{Eq. 15}$$

This result is arranged in a single vector to get:

$$\text{SvrVec}=[\text{diff\_val}(\text{section}_1),\text{diff\_val}(\text{section}_2),\text{diff\_val}(\text{section}_3)\ldots] \quad \text{Eq. 16}$$

The vectors NeighVec, ExtrLocVec and SvrVec, alongside the basic characteristics are used to determine which rectangles (715) contain wiper streaks (310, 315). First, the median and the Std of the vector StdVec are determined and denoted as MedStdVec and StdStdVec respectively:

$$\text{StdStdVec}=\text{std}(\text{StdVec}) \quad \text{Eq. 17}$$

$$\text{MedStdVec}=\text{median}(\text{StdVec}) \quad \text{Eq. 18}$$

Sections whose Std value is higher than MedStdVec+ 2*StdStdVec (e.g. sections whose Std is relatively large in comparison to other Std's), and whose value in the vector NeighVec is 1 are determined. This result is arranged in a single vector, IsWiper, to get:

$$IsWiper(\text{section}) = \begin{cases} \text{Yes}, & \text{if } [StdVec(\text{section}) > MedStdVec + 2 \cdot StdStdVec] \, \& \\ & [NeighVec(\text{section}) = 1] \\ \text{No}, & \text{else} \end{cases} \quad \text{Eq. 19}$$

Rectangles (715) whose entry in IsWiper vector equals 1 are rectangles (715) that contain a wiper streak (310, 315).

Figure 9:
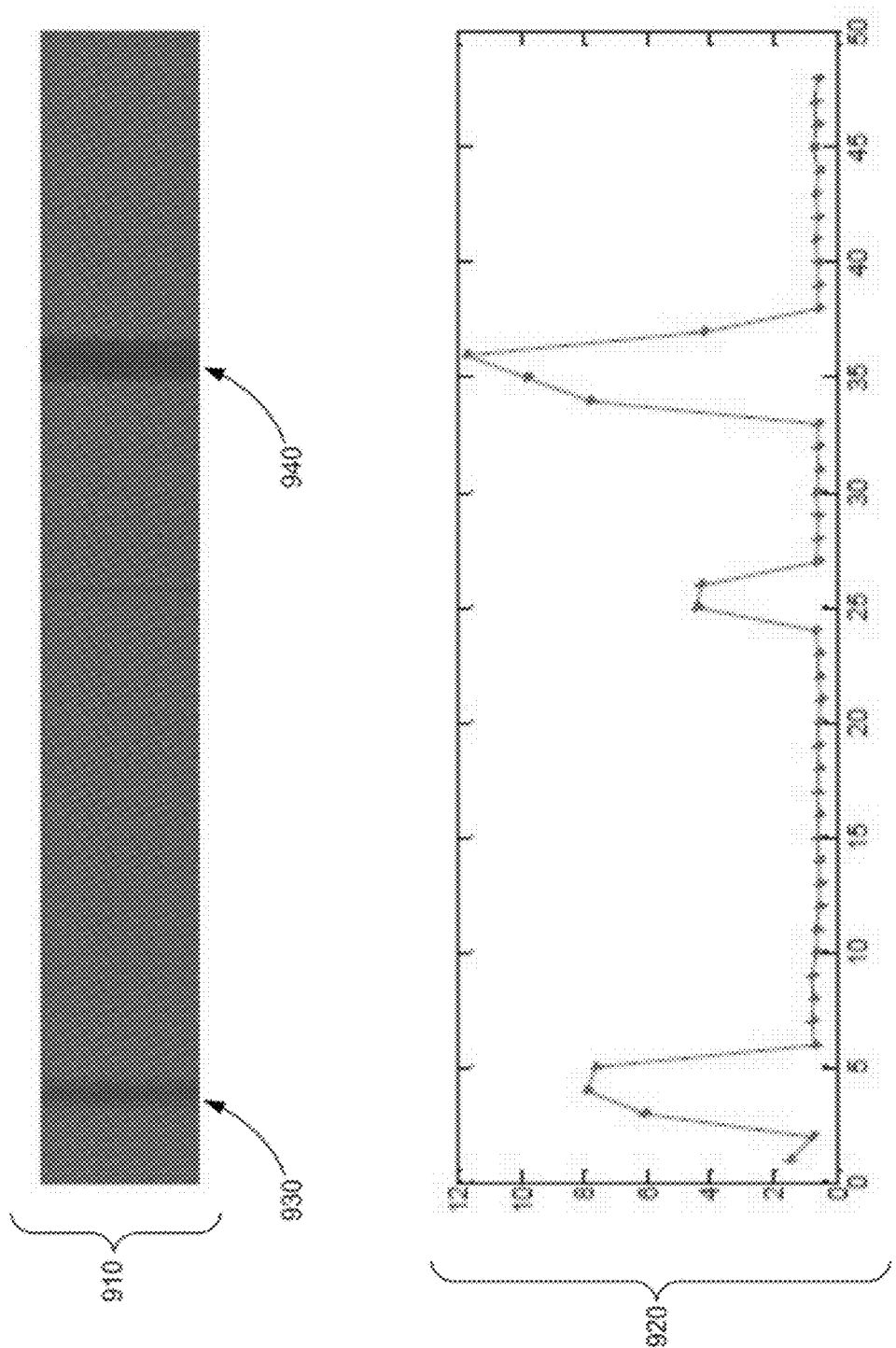
FIG. 9 is a diagram of a severity vector according to an example of the principles described herein.

Next, the streak detector (135) determines (815) the location and severity of a streak (310, 315) for each rectangle (715) comprising a streak. The severity of these rectangles (715) is set to be the entries of the vector SvrVec. FIG. 9 is a diagram of a severity vector according to an example of the principles described herein. In FIG. 9, the top portion (910) is a portion of the captured image (700), and the bottom portion (920) is a graph of the vector StdVec. In the example of FIG. 9, MedStdVec equals 0.5, StdStdVec=2 and IsWiper is 1 for sections 4 (930) and 36 (940). The severity of these sections is approximately 22, which is relatively high.

Returning to FIG. 8, the streak detector (135) then determines (block 820) which streaks (310, 315) overlap a plurality of rectangles (715) and cluster those streaks that overlap. Due to the overlapping of the rectangles (715), a single streak (310, 315) may have been detected in two adjacent rectangles (715). Since the wiper streak (310, 315) is relatively wide, streaks that are less than approximately 40 pixels apart are clustered into a single streak. After each rectangle (715) is processed, the results from the different rectangles (715) are clustered. This performed since a streak (310, 315) may, be found on more than one rectangle (715).

Further, as discussed above in connection with FIGS. 2 through 9, the streaks (210, 215, 220, 225, 310, 315) are approximately vertical. In an example wherein a streak (210, 215, 220, 225, 310, 315) is oriented in the capture image (400, 700) at a diagonal, preprocessing such as rotating the capture image (400, 700) is performed to orient the streak (210, 215, 220, 225, 310, 315) in a vertical or approximately vertical position. In another example, the Hough transform may be utilized to detect streaks (210, 215, 220, 225, 310, 315) at various non-vertical angles.

The methods described above may be accomplished in conjunction with a computer program product comprising a computer readable medium having computer usable program code embodied therewith that, when executed by a processor, performs the above methods. Specifically, the computer program product detects and evaluates the severity of a number of streaks within a captured image.

The specification and figures describe systems and methods for detecting streaks in printed images. With an imaging device, an image of a printed document is captured and image data representing the printed document is transmitted to a computing device. The computing device divides the image data into a number of rectangles horizontally across the image data so that the rectangles overlap in the horizontal direction, and determines if a rectangle comprises a streak. These systems and methods for detecting streaks in printed images may have a number of advantages, including: (1) flexibility to detect and evaluate the severity of a number of streaks with a wide range of sizes or thicknesses; (2) displacement of human interaction to determine the existence and severity of streaks; and (3) obtainment of consistent values of severity of the streaks.

The preceding description has been presented to illustrate and describe examples of the principles described. This description is not intended to be exhaustive or to limit these principles to any precise form disclosed. Many modifications and variations are possible in light of the above teaching.

What is claimed is:

1. A method of detecting streaks in printed documents comprising:
    with an imaging device, capturing an image of a printed document;
    transmitting the image data representing the printed document to a computing device,
    with the computing device, dividing the image data into a number of rectangles horizontally across the image data so that the rectangles overlap in the horizontal direction;
    with the computing device, determining the maximum, minimum, median, standard deviation, and average values for each rectangle; and
    with the computing device, determining rectangles that comprise a streak and rectangles that do not comprise a streak but comprise noise based on the maximum, minimum, median, standard deviation, and average values for each rectangle.

2. The method of claim 1, further comprising transforming the image data into a grayscale image.

3. The method of claim 1 further comprising:
    with the computing device, determining the locations and severity of a streak for each rectangle comprising a streak; and
    with the computing device, determining which streaks overlap a plurality of rectangles and clustering those streaks that overlap.

4. The method of claim 1, further comprising rotating the image of a printed document so that the streaks are oriented in an approximately vertical position.

5. The method of claim 1, in which determining if a rectangle comprises a streak comprises, with the computing device, determining the Kurtosis value for each rectangle.

6. The method of claim 1, further comprising with the computing device, dividing the rectangles vertically forming a number of non-overlapping columns in the vertical direction.

7. The method of claim 6, further comprising, with the computing device, determining the severity of a streak for each rectangle comprising a streak.

8. The method of claim 7, further comprising, with the computing device, determining the average severity of a streak for each column of rectangles that contains a streak.

9. A computer program product for detecting streaks in printed documents, the computer program product comprising:
    a computer readable storage medium comprising computer usable program code embodied therewith, the computer usable program code comprising:
        computer usable program code that, when executed by a processor, rotates the image data representing the printed document so that the streaks are oriented in an approximately vertical position;
        computer usable program code that, when executed by a processor, divides image data representing a printed document into a number of rectangles horizontally across the image data so that the rectangles overlap in the horizontal direction;
        computer usable program code that, when executed by a processor, determines the maximum, minimum, median, standard deviation, and average values for each rectangle; and
        computer usable program code that, when executed by a processor, determines rectangles that comprise a streak and rectangles that do not comprise a streak but comprise noise based on the maximum, minimum, median, standard deviation, and average values for each rectangle.

10. The computer program product of claim 9, further comprising computer usable program code that, when executed by a processor, divides the rectangles vertically forming a number of non-overlapping columns in the vertical direction.

11. The computer program product of claim 9, further comprising computer usable program code that, when executed by a processor, determines the severity of a streak for each rectangle comprising a streak.

12. The computer program product of claim 9, further comprising computer usable program code that, when executed by a processor, determines which streaks overlap a plurality of rectangles and clustering those streaks that overlap.

13. The computer program product of claim 9, further comprising computer usable program code that, when executed by a processor, transforms the image data representing the printed document into a grayscale image.

* * * * *

UNITED STATES PATENT AND TRADEMARK OFFICE
CERTIFICATE OF CORRECTION

| | | |
|---|---|---|
| PATENT NO. | : 8,761,454 B2 | Page 1 of 1 |
| APPLICATION NO. | : 13/104490 | |
| DATED | : June 24, 2014 | |
| INVENTOR(S) | : Berkovich et al. | |

It is certified that error appears in the above-identified patent and that said Letters Patent is hereby corrected as shown below:

In the Claims

Column 10, line 9, Claim 1, delete "device," and insert -- device; --, therefor.

Signed and Sealed this
Seventh Day of October, 2014

Michelle K. Lee
*Deputy Director of the United States Patent and Trademark Office*